United States Patent [19]
Tomura et al.

[11] 3,753,075
[45] Aug. 14, 1973

[54] INVERTER

[75] Inventors: Teruichi Tomura; Hiroyuki Iyama, both of Kunitachi, Japan

[73] Assignee: Hitachi, Ltd., Tokyo, Japan

[22] Filed: July 3, 1972

[21] Appl. No.: 268,444

[30] Foreign Application Priority Data
July 6, 1971 Japan.............................. 46/49712

[52] U.S. Cl.................................. 321/44, 331/117
[51] Int. Cl........................................... H02m, H03b
[58] Field of Search.................... 331/108, 109, 112, 331/117, 169; 321/45 R, 43

[56] References Cited
UNITED STATES PATENTS
| | | | |
|---|---|---|---|
| 2,849,611 | 8/1958 | Adams | 331/117 |
| 2,896,170 | 7/1959 | Grewe | 331/117 |
| 2,939,000 | 5/1960 | Krugman | 331/109 X |
| 3,521,942 | 7/1970 | Temple | 331/108 R |
| 3,582,754 | 6/1971 | Hoffman et al. | 331/117 R |

FOREIGN PATENTS OR APPLICATIONS
| | | | |
|---|---|---|---|
| 221,037 | 7/1968 | U.S.S.R. | 331/108 R |
| 1,086,302 | 8/1960 | Germany | 331/117 |

*Primary Examiner*—William H. Beha, Jr.
*Attorney*—Paul M. Craig, Jr., Donald R. Antonelli et al.

[57] ABSTRACT

An inverter for transforming a d.c. current to an a.c. current comprising, a switching transistor and an output transformer having a primary winding connected to the collector of the transistor, a current transformer having a primary winding connected to the primary winding of the output transformer and a secondary winding connected to the base of the switching transistor, a coupling capacitor inserted between said base of the transistor and the secondary winding of the current transformer, a capacitor parallelly connected to the primary winding of the output transformer, the primary windings of the output and current transformers and said capacitor forming a resonance circuit to control the oscillation.

21 Claims, 13 Drawing Figures (a) COLLECTOR VOLTAGE
(b) COLLECTOR CURRENT
(c) FEED-BACK VOLTAGE
(d) BASE VOLTAGE (a) COLLECTOR VOLTAGE
(b) COLLECTOR CURRENT
(c) CURRENT TRANSFORMER PRIMARY CURRENT
(d) BASE CURRENT

INVERTER

BACKGROUND OF THE INVENTION

1. Field of the Invention

This invention relates to an inverter, and more particulary to a self-excitation type inverter.

2. Description of the Prior Art

Generally, inverters are used for transforming a d.c. current into an a.c. current of a predetermined frequency. In self-excitation type inverters, a part of the a.c. output is positively fed back to perform self-excited oscillation. Conventional inverters are, however, accompanied with a power loss which lowers the inversion efficiency and in the case of using a transistor as a switching element causes the problem of temperature increase in the transistor. For decreasing this power loss, the amount of the positive feed-back is set small. In such a case, however, it takes a longer time for a transistor to change from the switched-on state to the cut-off state and the collector loss in this period increases.

SUMMARY OF THE INVENTION

An object of the invention is to provide an inverter having a smaller power loss and a higher inversion efficiency.

Another object of the invention is to provide an inverter capable of performing a stable operation and including a transistor which works as a switching element and is accompanied with only a low temperature increase.

Further object of the invention is to provide an inverter which is not influenced from the parameters of a transistor.

For achieving the above objects, a part of the output is positively fed back not directly but through a current transformer, according to the invention.

Now, the structure, functions and effects of the invention will be described in connection with the accompanied drawings in comparison with the prior art.

DESCRIPTION OF THE PREFERRED EMBODIMENTS

Figure 1:
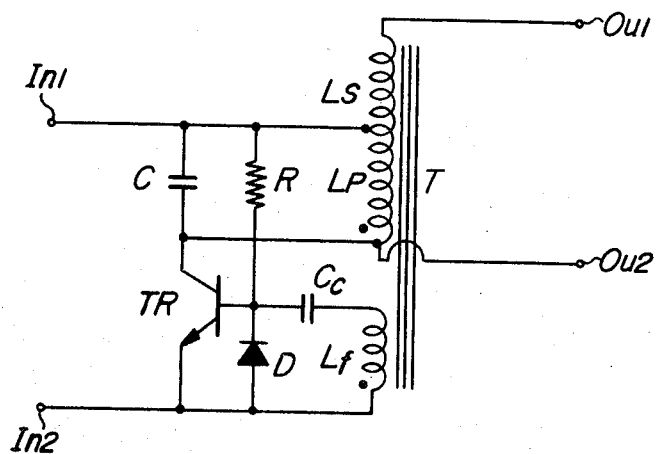
FIG. 1 is a circuit diagram of a conventional self-excitation type inverter.

Generally, inverter circuits are used for transforming a d.c. voltage or current into an a.c. voltage or current of a predetermined frequency. Conventionally, such inverter circuits have been used as a self-excitation type inverter shown in FIG. 1. In FIG. 1, reference TR indicates a transistor used as an amplifying element, T a transformer for deriving an a.c. output, $L_p$ the primary winding of the transformer T, $L_s$ the secondary winding of the transformer T, and $L_f$ a feed-back winding of the transformer T for positively feeding back a part of the a.c. output to perform self-excited oscillation. The transistor TR and the primary winding $L_p$ of the transformer are serially connected between input terminals $I_{n1}$ and $I_{n2}$ applied with a d.c. power. A capacitor C is connected between the input terminal $I_{n1}$ and the collector of the transistor TR and forms a resonance circuit with the primary winding $L_p$ of the transformer T. A resistive element R affords a bias to the transistor TR to enhance the starting action. A coupling capacitor $C_c$ is connected between the feed-back winding $L_f$ and the base of the transistor TR and supplies the output of the feed-back winding $L_f$ as a base input in a.c. manner. Here, a predetermined d.c. bias is also given to the base of the transistor independently of the positive feed-back. A diode D is connected between the interconnection of the base of the transistor TR and the coupling capacitor $C_c$ and the emitter of the transistor TR, thereby charges the coupling capacitor $C_c$ during the period when the output voltage of the feed-back winding $L_f$ becomes negative (while the transistor TR is cut off), supplies a bias required for driving the transistor TR during the positive period (while the transistor is turned on), and protects the base of the transistor from an excess input application. Here, references $O_{u1}$ and $O_{u2}$ are output terminals.

Figure 2:
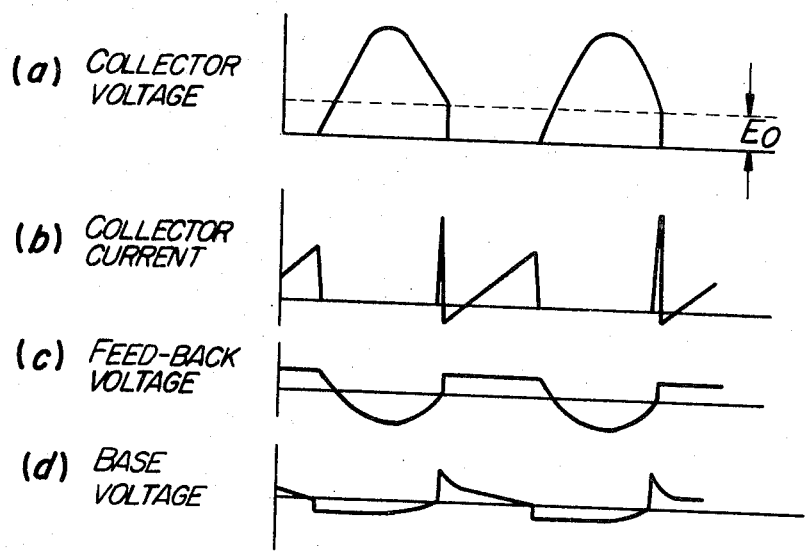
FIGS. 2a to 2d show waveforms at various points of the circuit of FIG. 1 for explaining the operation.

In such a circuit, the constituent elements of the circuit are selected to such values that are appropriate to on-off operating of the transistor. The circuit operates in the following manner. When a d.c. source is connected between the input terminals $I_{n1}$ and $I_{n2}$, a current is allowed to flow through the resistor R to the base of the transistor TR. Due to the base current, a collector current is allowed to flow and the transistor is in the "on" state. The voltage between the collector and the emitter of the transistor is very low in the on state and thus the source voltage is mostly applied to the primary winding $L_p$ of the transformer T. A voltage determined by the ratio of windings is induced in the feed-back winding $L_f$ in such a sense that the induced voltage increases the base current, and thereby the collector current is further increased. Namely, a positive feed-back is done. When the collector current reaches a certain value which is determined by the base current, the collector current does not increase further. Hence, the voltage induced in the feed-back winding $L_f$ decreases, the collector current decreases, and thus the transistor TR becomes cut off. Upon this cut-off, the electromagnetic energy stored in the primary winding $L_p$ of the transformer is caused to oscillate in the resonance circuit consisting of the winding $L_p$ and the capacitor C. Thus, the collector voltage achieves an oscillation with a center set at a d.c. input voltage $E_o$ as is shown in FIG. 2a. Hence, a voltage proportional to the collector voltage is induced in the feed-back winding $L_f$ as is shown in FIG. 2c. The capacitor $C_c$ is charged by this feed-back voltage, but the base voltage of the transistor holds a small negative value as is shown in FIG. 2d by the limiter action of the diode D. When the voltage of the feed-back winding $L_f$ follows up the change in the collector voltage shown in FIG. 2a and exceeds the maximum value, the limiter action of the diode D is stopped and the base current begins to increase as is shown in FIG. 2d. When this base voltage arrives at the triggering voltage of the transistor TR, the transistor TR changes into the on state and a collector current is allowed to flow. When the transistor becomes on in this manner, a positive feed-back is performed as is described above. At this moment, since the capacitor C is connected to the transistor TR as a load, a large current is temporarily allowed to flow. Namely, the collector current rapidly decreases as is shown in FIG. 2a, and the collector current becomes a spike-shaped current as is shown in FIG. 2b. When the transistor then becomes turned on, the excess energy remaining in the inductance of the winding $L_p$ is discharged and the collector current becomes a reverse current. Since the load is an inductance, the collector current increases with increasing time as is shown in FIG. 2b. During this period, the charge stored in the coupling capacitor $C_c$ is discharged as a base current, hence the voltage between the two electrodes of the capacitor decreases, and becomes unable to keep the transistor TR in the on state. Thus, the collector current becomes not increasing and the transistor TR becomes cut off as is described above. Thereafter, similar actions repeat and the collector voltage continues oscillation as is shown in FIG. 2a.

The conventional circuit as described above is, however, accompanied with the following drawbacks. First, the sipke current is the collector current appears while a collector voltage exists, and thus a power loss is accompanied thereto. Thus, not only the transformation efficiency is lowered, but the temperature increase in the transistor becomes large. If the amount of the positive feed-back is set small for decreasing this power loss, it takes a longer time to shift from the on state to the "off" state and the collector loss in this period increases.

Next, since the output voltage of the feed-back winding in the on period of the transistor is constant and the output impedance is low, the discharge of the coupling capacitor $C_c$ occurs rapidly and the base voltage decreases in a short period. Thus, a large capacitance is required for keeping the required on period. The use of parts having critical values for reducing these drawbacks not only leads to an unstable operation, but also enlarges the variation in the active states due to the difference in parameters of thy transistor.

This invention is intended to solve such drawbacks and provides an inverter having a low power loss in a transistor, a high inversion efficiency and a low temperature increase in the transistor, which is further stable in operation even if the coupling capacitance is made smaller and almost free from the influences of the parameters of the transistor.

Figure 3:
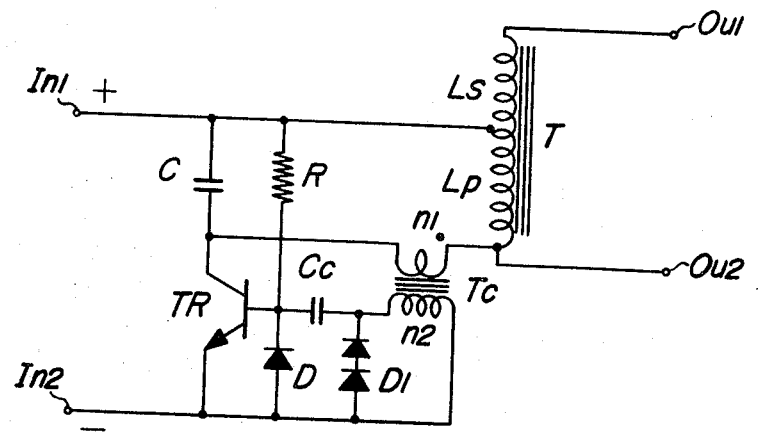
FIG. 3 is a circuit diagram of an embodiment of an inverter according to the invention.

FIG. 3 is a circuit diagram of an embodiment of an inverter according to the invention, in which similar references indicate similar parts as those in FIG. 1. A current transformer $T_c$ has a primary winding $n_1$ inserted in a resonance circuit including a capacitor C and the primary winding $L_p$ of a transformer T, and a secondary winding $n_2$ arranged to feed back the output to an amplifying element. A diode $D_1$ is parallelly connected to the secondary winding $n_2$. By the above arrangement, the current flowing through the primary winding $L_p$ of said resonance circuit is applied to the primary winding $n_1$ of the current transformer $T_c$, and the signal induced in the secondary winding $n_2$ is used for feed-back.

Figure 4:
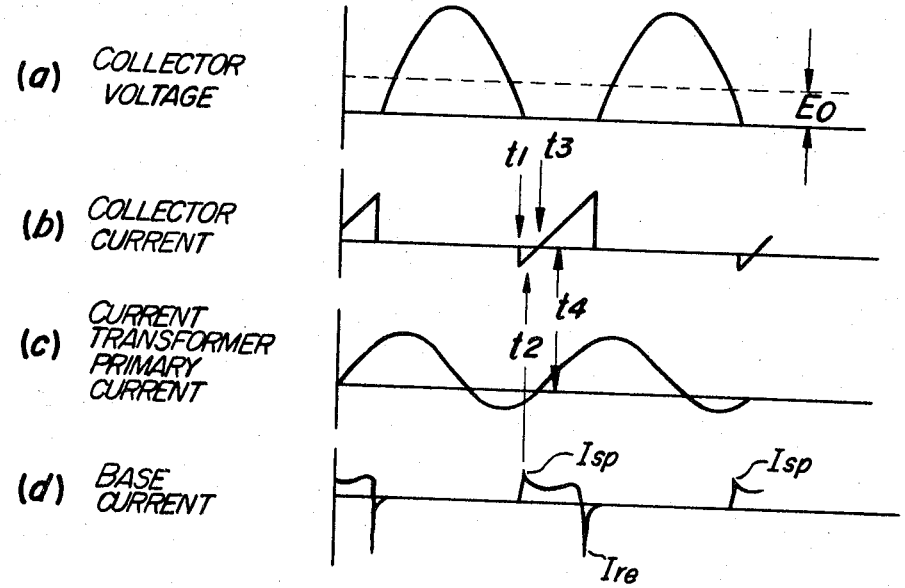
FIGS. 4a to 4d show waveforms at various points of the circuit of FIG. 3 for explaining the operation of the inverter.

Now, the operation of this circuit will be described. It is same with the conventional circuit described before that when the transistor TR becomes cut-off, the electromagnetic energy stored in the primary winding $L_p$ is allowed to oscillate sinusoidally in the resonance circuit as is shown in FIG. 4a. The current flowing through said resonance circuit has a phase 90° delayed with respect to that of the voltage. Thus, the current flowing through the current transformer $T_c$ cannot become a signal capable of changing the transistor TR into the on state even when the collector voltage reaches the emitter voltage (at time $t_1$ shown in FIG. 4b). Thus, there appears no spike-shaped collector current as has appeared in the conventional circuit, and hence no increase in the collector loss in the transistor TR occurs. Then, when the collector voltage begins to decrease to lower than the emitter voltage, a current is allowed to flow through the diode D and the base-collector junction of the transistor TR. The energy remaining in the inductance of the primary winding $L_p$ is discharged and the collector current becomes a reverse current. However, since the load is an inductance, the collector current increases with increasing time and becomes positive after time $t_3$ as is shown in FIG. 4b. A positive collector current, however, cannot be allowed to flow unless a base current is supplied to the transistor TR. Namely, it is necessary to supply a base current to the transistor TR at time $t_2$ between time $t_1$ and $t_3$ shown in FIG. 4b. With only the current transformer $T_c$, however, the time for supplying a base current becomes $t_4$ and is too late. The delay of the supply of a base current only puts off the turn-on of the transistor TR, and hence the transistor may be left turned off until a base current is supplied by a current flowing through the current transformer $T_c$. If it is desired to obtain the on state earlier, diodes D and $D_1$ having different terminal voltages may be connected on the both sides of the coupling capacitor $C_c$ as is shown in FIG. 3 so as to increase the impedance between the terminals of the secondary winding $n_2$ at the start of the off state of the transistor TR and thus preventing the discharge of the coupling capacitor $C_c$. In this case, since the coupling capacitor $C_c$ is connected at the both electrodes to the diodes D and $D_1$ of different terminal voltages, it is charged by the voltage equal to the voltage difference between the two diodes. As a result, the charge of the coupling capacitor $C_c$ becomes a base current and the time when a base current begins to flow becomes earlier. When the transistor TR becomes turned on and the collector current begins to flow, the terminal voltage of the coupling capacitor $C_c$ decreases, but the current flowing through the current transformer $T_c$ working as a feed-back current increases as is shown in FIG. 4c. Thus, the base current shown in FIG. 4d once decreases from the spike-shaped current $I_{sp}$ as is shown in FIG. 4d between the base and the collector which allows a reverse collector current, again increases and then is kept substantially constant by the terminal voltage of the coupling capacitor $C_c$. When the base current begins to decrease by the discharge of the coupling capacitor $C_c$, the collector current begins to decrease and hence the primary current of the current transformer $T_c$ also begins to decrease which, in turn, works to further decrease the base current by the positive feed-back. The impedance of the feed-back winding increases and the secondary winding $n_2$ approaches open and generates a large voltage, as is shown in FIG. 4d. Thus a reverse current $I_{re}$ is allowed to flow as a base current as shown in FIG. 4d and the transistor TR is rapidly cut off. Thereafter, similar operations as described before are repeated. Here, an appropriate selection of the number of windings in the current transformer $T_c$ can attain the saturation of the iron core of the current transformer $T_c$ only by the increase in the primary current at a final stage of the on period of the transistor TR, and thus can rapidly nullify the terminal voltage of the secondary winding. Then, a reverse current can be given to the base of the transistor by the charge stored in the coupling capacitor $C_c$ and the transistor can be rapidly cut off independently of the positive feed-back. Thus, the collector loss in the off state in this type of self-excited inverter can be reduced almost to zero as in the case of separate excitation. As a result, the collector loss can be easily reduced to less than one half compared with the conventional circuits.

As is described above, according to the invention a current transformer is used in a self-excited type inverter for achieving positive feed-back and thus can supply a sufficient driving current to the transistor and hence the circuit characteristics can be made almost free from the influence of the current amplification factor of the transistor. According to the actual measurement, only variations of the order of 1 percent appeared in the output when the current amplification factor was varied from 10 to 50. Further, since the load current also flows through the current transformer, the load characteristics are very good and the output voltage hardly changes by an increase in the load. Yet further, the capacitance of the coupling capacitor may be reduced below 1/10 of the conventional one, for example a capacitance of 0.5 $\mu$F is enough for an inverter of 100 w output.

Figure 5:
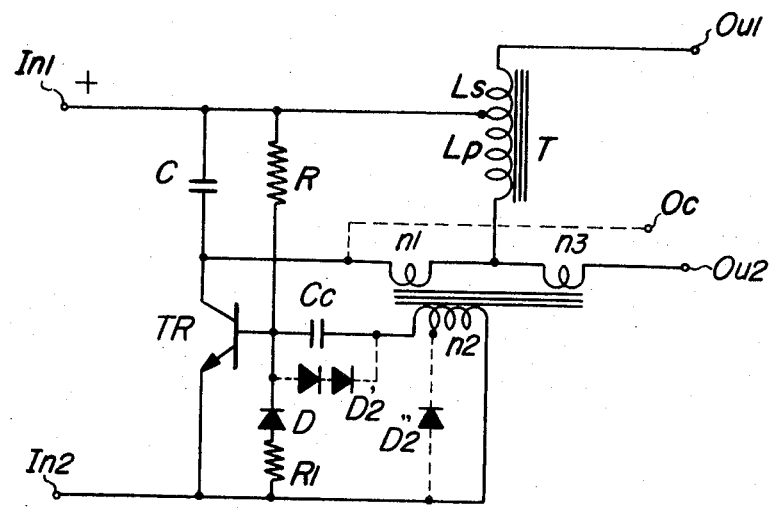
FIGS. 5 to 7 are circuit diagrams of other embodiments of an inverter according to the invention.

Next, the connection of the diodes for controlling the terminal voltage of the coupling capacitor $C_c$ is not limited to one shown in FIG. 3, but may be one shown by $D_2'$ or $D_2''$ indicated by dotted lines in FIG. 5. In the case of the diode $D_2'$ connected as shown in the figure, the terminal voltage of the coupling capacitor $C_c$ is increased by the voltage due to the diode D compared with the embodiment shown in FIG. 3. In the case of the connection of $D_2''$, the voltage can be freely changed by the position of the tap on the secondary winding $n_2$ of the current transformer $T_c$. Alternatively, a resistance element $R_1$ can be serially connected to the diode D to vary the voltage. By these arrangement, the magnitude of the base current can be selected to a value appropriate for the characteristics of the transistor.

Further, if another winding $n_3$ is added as the windings of the current transformer to the primary and the secondary windings $n_1$ and $n_2$ as is shown in the circuit of FIG. 5, the feed-back of the load current becomes larger and the duration of the on state of the transistor can be changed according to the output.

Figure 6:
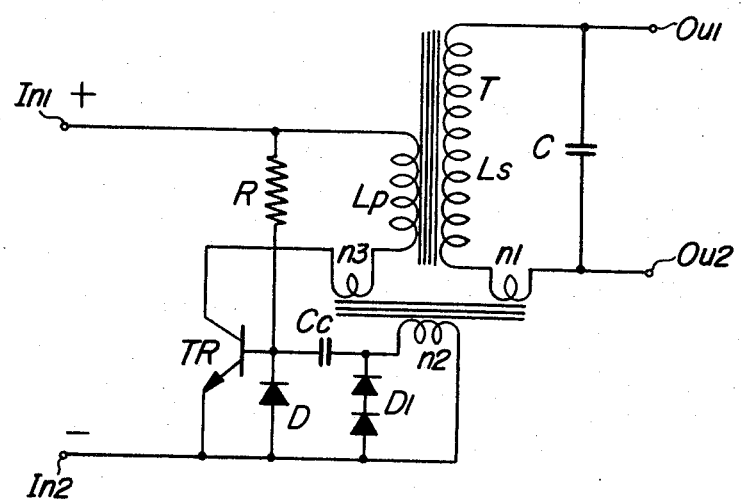

Further, the output transformer T may be formed of separate windings as shown in FIG. 6. A capacitor C is parallelly connected to the secondary winding to form a resonance circuit. Similar effects as those of the above embodiments can be obtained also in this embodiment by forming other constituents of the circuit to be same as those of the embodiments shown in FIGS. 3 and 5. Yet further, an inverter circuit of the push-pull connection can be formed employing separate windings and using two amplifying elements.

Figure 7:
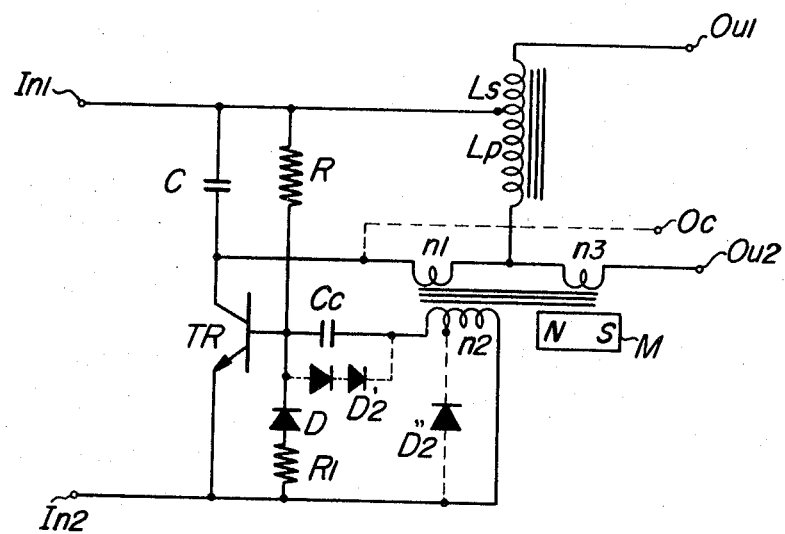

Next, if the current transformer is magnetically biased by winding d.c. bias windings, or bringing a magnet into the neighborhood, the current transformer changes in the saturation characteristic and it becomes possible to control the output. For example, a permanent magnet M may be approached to and driven off the circuit of FIG. 5 as is shown in FIG. 7.

In the above description, a transistor is used as the amplifying element working as a switching element, but the amplifying element may also be formed of those of high input impedance such as a vacuum tube with an addition of a non-linear element such as a diode connected to the input, to obtain similar effects as those obtaines by a transistor.

We claim:

1. An inverter comprising:
    an amplifying element used as a switching element and having an input terminal to be connected to a d.c. source;
    an output transformer connected to an output terminal of said amplifying element;
    a current transformer having a primary winding and a secondary winding electromagnetically coupled thereto, for positively feeding back the current flowing through the output transformer to the control terminal of said amplifying element;
    a coupling capacitance connected between the secondary winding of said current transformer and the control terminal of said amplifying element;
    a resonance circuit including said primary winding of the current transformer, the output transformer and a capacitance connected parallelly thereto; and
    bias supply means connected between said resonance circuit and the control terminal of said amplifying element;
    said resonance circuit controlling the oscillation of the circuit and said d.c. current being transformed into a a.c. current and derived through said output transformer.

2. An inverter according to claim 1, further comprising a non-linear element connected to the control terminal of said amplifying element so that the impedance between the terminals of the secondary winding of said current transformer increases only in the starting stage of the "off" state of said amplifying element.

3. An inverter according to claim 1, further comprising a first non-linear element connected to the control terminal of said amplifying element so that the impedance between the terminals of the secondary winding of said current transformer increases only in the starting stage of the "off" state of said amplifying element, and a second non-linear element parallelly connected to said coupling capacitor so that the terminal voltage of said coupling capacitance is maintained substantially constant in the "off" period of said amplifying element.

4. An inverter according to claim 1, in which said current transformer is formed of a third winding inserted between said output transformer and the output terminals of said amplifying element, and electromagnetically coupled with said secondary winding.

5. An inverter according to claim 4, further comprising a non-linear element connected to the control terminal of said amplifying element so that the impedance between the terminals of the secondary winding of said current transformer increases only in the starting stage of the "off" state of said amplifying element.

6. An inverter according to claim 4, further comprising a first non-linear element connected to the control terminal of said amplifying element so that the impedance between the terminals of the secondary winding of said current transformer increases only in the starting stage of the "off" state of said amplifying element, and a second non-linear element parallelly connected to said coupling capacitor so that the terminal voltage of said coupling capacitance is maintained substantially constant in the "off" period of said amplifying element.

7. An inverter according to claim 1, in which the secondary winding of said output transformer is formed of a separate winding and said capacitance is parallelly connected to said secondary winding.

8. An inverter according to claim 7, further comprising a non-linear element connected to the control terminal of said amplifying element so that the impedance between the terminals of the secondary winding of said current transformer increases only in the starting stage of the "off" state of said amplifying element.

9. An inverter according to claim 7, further comprising a first non-linear element connected to the control terminal of said amplifying element so that the impedance between the terminals of the secondary winding of said current transformer increases only in the starting stage of the "off" state of said amplifying element, and a second non-linear element parallelly connected to said coupling capacitor so that the terminal voltage of said coupling capacitance is maintained substantially constant in the "off" period of said amplifying element.

10. An inverter according to claim 7, in which said current transformer consists of a third winding serially connected to the primary winding of said output transformer and electromagnetically coupled with said secondary winding.

11. An inverter according to claim 10, further comprising a non-linear element connected to the control terminal of said amplifying element so that the impedance between the terminals of the secondary winding of said current transformer increases only in the starting stage of the "off" state of said amplifying element.

12. An inverter according to claim 10, Further comprising a first non-linear element connected to the control terminal of said amplifying element so that the impedance between the terminals of the secondary winding of said current transformer increases only in the starting stage of the "off" state of said amplifying element, and a second non-linear element parallelly connected to said coupling capacitor so that the terminal voltage of said coupling capacitance is maintained substantially constant is the "off" period of said amplifying element.

13. An inverter according to claim 1, further comprising a first non-linear element connected to the control terminal of said amplifying element so that the impedance between the terminals of the secondary winding of said current transformer increases only in the starting stage of the "off" state of said amplifying element, and a second non-linear element parallelly connected to said secondary winding so that the terminal voltage of said coupling capacitor is limited substantially constant in the "off" period of said amplifying element.

14. An inverter according to claim 4, further comprising a first non-linear element connected to the control terminal of said amplifying element so that the impedance between the terminals of the secondary winding of said current transformer increases only in the starting stage of the "off" state of said amplifying element, and a second non-linear element parallelly connected to said secondary winding so that the terminal voltage of said coupling capacitor is limited substantially constant in the "off" period of said amplifying element.

15. An inverter according to claim 7, further comprising a first non-linear element connected to the control terminal of said amplifying element so that the impedance between the terminals of the secondary winding of said current transformer increases only in the starting stage of the "off" state of said amplifying element, and a second non-linear element parallelly connected to said secondary winding so that the terminal voltage of said coupling capacitor is limited substantially constant in the "off" period of said amplifying element.

16. An inverter according to claim 10, further comprising a first non-linear element connected to the control terminal of said amplifying element so that the impedance between the terminals of the secondary winding of said current transformer increases only in the starting stage of the "off" state of said amplifying element, and a second non-linear element parallelly connected to said secondary winding so that the terminal voltage of said coupling capacitor is limited substantially constant in the "off" period of said amplifying element.

17. An inverter according to claim 5, in which said non-linear element has a series resistor connected thereto.

18. An inverter according to claim 8, in which said non-linear element has a series resistor connected thereto.

19. An inverter according to claim 11, in which said non-linear element has a seriss resistor connected thereto.

20. An inverter according to claim 9, in which said non-linear element has a series resistor connected thereto.

21. An inverter according to claim 12, in which said non-linear element has a series resistor connected thereto.

* * * * *